United States Patent Office 3,729,438
Patented Apr. 24, 1973

3,729,438
LATEX POLYMERS OF VINYLACETATE AND A SILANE
Marion F. Plesich, Ossining, N.Y., and Edmund A. Zavaglia, Newark, Del., assignors to Union Carbide Corporation, New York, N.Y.
No Drawing. Filed Mar. 30, 1970, Ser. No. 23,992
Int. Cl. C08f 1/13, 3/56
U.S. Cl. 260—29.6 R                             5 Claims

ABSTRACT OF THE DISCLOSURE

Latex polymers comprising an aqueous dispersion of an interpolymer selected from the class consisting of (A) a copolymer of vinyl acetate and vinyl hydrolyzable silane and (B) a terpolymer of vinyl acetate, an ester, e.g. acrylic ester, maleic ester or fumarate ester, and vinyl hydrolyzable silane, as well as the crosslinked polymers derived therefrom; said latex polymers having utility as protective surface coatings and as vehicles for paint formulations.

BACKGROUND OF THE INVENTION

This invention relates to novel latex polymers and to the novel cross-linked polymers derived therefrom. More particularly this invention relates to novel silane latex polymers which polymerize into clear, stable crosslinked polymers merely upon drying and the elimination of water.

The term "latex polymer" has a meaning well known in the art and is used to designate an aqueous dispersion of a water-insoluble polymer which is present in the form of very fine particles. Latex polymers are often referred to as polymer or interpolymer latices, or aqueous emulsion polymers.

Latex polymers are well known in the art and have found wide utility as vehicles in the preparation of surface coating compositions. For instance they are often employed as adhesives and as film forming agents in paint compositions designated for all types of application and exposure.

SUMMARY OF THE INVENTION

Therefore it is an object of this invention to provide silane latex polymers suitable for use in the field of surface coatings. A further object of this invention is to provide crosslinked polymers derived from said latex polymers suitable for use as a coating protective for a substrate. Other objects and advantages of this invention will become readily apparent from the following description and appended claims.

More specifically the latex polymers of this invention are film forming compositions comprising an aqueous dispersion of a water insoluble interpolymer consisting essentially of (a) a vinyl hydrolyzable silane and (b) an ester selected from the class consisting of acrylic esters, maleic esters and fumaric esters, and/or (c) vinyl acetate. Upon removal of the water from said latex polymer, the interpolymer therein further polymerizes or cures into a clear stable crosslinked polymer.

The latex polymers of this invention comprise an aqueous dispersion of a crosslinkable polymer wherein the total solids content of said latex ranges from about 45 weight percent up to about 60 weight percent.

DESCRIPTION OF THE PREFERRED EMBODIMENTS

The vinyl hydrolyzable silane monomers employed in producing the latex polymer of this invention are those silanes of the formula $$R_3SiX$$

wherein X represents a radical selected from the group consisting of gamma-methacryloxypropyl and vinyl radicals; wherein each R individually represents a hydrolyzable radical selected from the group consisting of acetoxy and alkoxy radicals having from 1 to 8 carbon atoms. Illustrative examples of such alkoxy radicals are methoxy, ethoxy, propoxy, butoxy, isobutoxy, pentoxy, hexoxy, and the like; alkoxyalkoxy radicals such as methoxymethoxy, ethoxymethoxy, and the like; and alkoxyaryloxy such as ethoxyphenoxy and the like; preferably R is methoxy or ethoxy.

Such silane monomers as well as methods for their preparation are well known in the art. Illustrative of the more preferred silanes that can be employed are for example, vinyltrimethoxysilane, vinyltriethoxysilane, vinyltris(2 - methoxyethoxy) silane, gamma-methacryloxypropyltrimethoxysilane, vinyltriacetoxysilane, and the like. The most preferred silane is vinyltrimethoxysilane.

The acrylic esters that can be employed in producing the latex polymer of this invention are the alkyl esters of acrylic acid wherein the alkyl groups are saturated straight or branch chain radicals containing from 2 to 20 carbon atoms. Such acrylates as well as methods for their preparation are well known in the art. Illustrative examples of such acrylates that may be mentioned are ethyl acrylate, n-butyl acrylate, tertiary butyl acrylate, isobutyl acrylate, amyl acrylate, ethyl butyl acrylate, 2-ethylhexyl acrylate, octylacrylate, nonyl acrylate, decyl acrylate, tridecyl acrylate, tetra decyl acrylate, hexadecyl acrylate, octa decyl acrylate, and the like. The most preferred acrylate is 2-ethylhexyl acrylate.

The maleic esters that can be employed in producing the latex polymers of this invention are the alkyl esters of maleic acid, wherein the alkyl groups are saturated straight or branch chain radicals having from 2 to 20, preferably 2 to 10, carbon atoms. Such maleates as well as methods for their preparation are well known in the art. Illustrative examples of such maleates that may be mentioned are dibutyl maleate, diethyl maleate, and the like.

The fumaric esters that can be employed in producing the latex polymers of this invention are the alkyl esters of fumaric acid, wherein the alkyl groups are saturated srtaight or branched chain radicals having from 2 to 20, preferably 2 to 10, carbon atoms. Such fumarates as well as methods for their preparation are well known in the art. Illustrative examples of such fumarates that may be mentioned are diethyl fumarate, dibutyl fumarate, and the like.

Of course it is to be understood that while it is preferred to employ only single silane and ester monomers at any one time, if desired, the latex polymers can be prepared using mixtures of two or more different silanes and/or mixtures of two or more different ester monomers and such types of compounds are intended to be covered by the term latex polymer used herein.

The second essential monomer employed in producing the latex polymers of this invention is vinyl acetate. Accordingly the polymer of said latex is an interpolymer consisting essentially of (A) a copolymer of (1) a vinyl hydrolyzable silane and (2) vinyl acetate or (B) a terpolymer of (1) a vinyl hydrolyzable silane, (2) an ester selected from the group consisting of acrylic esters, maleic esters or fumaric esters and (3) vinyl acetate. The most preferred interpolymer of this invention is the interpolymer of a vinyl hydrolyzable silane, an acrylic ester and vinyl acetate, especially the interpolymer of vinyltrimethoxysilane, 2-ethylhexylacrylate and vinyl acetate.

Other spectific interpolymers of this invention that may be mentioned are the copolymer of vinyltrimethoxysilane and vinyl acetate, the copolymer of vinyltriethoxysilane and vinyl acetate, the copolymer of vinyltriacetoxysilane and vinyl acetate, the copolymer of vinyl-tris-(2-methoxyethoxy)silane and vinyl acetate, the copolymer of gamma-methacryloxypropyltrimethoxysilane and vinyl acetate, the terpolymer of vinyltrimethoxysilane, ethylacrylate and vinyl acetate, the terpolymer of vinyltriethoxysilane, 2-ethylhexylacrylate and vinyl acetate, the terpolymer of vinyltrimethoxysilane, amylacrylate and vinyl acetate, the terpolymer of vinyl-tris(2-methoxyethoxy)silane, hexylacrylate and vinyl acetate, the terpolymer of vinyltriacetate silane, decylacrylate and vinyl acetate, the terpolymer of vinyltrimethoxysilane, tetradecylacrylate and vinyl acetate, the terpolymer of gamma-methacryloxypropyl-trimethoxysilane, 2-ethylhexylacrylate and vinyl acetate, the terpolymer of vinyltrimethoxy silane, octadecylacrylate and vinyl acetate, the terpolymer of vinyltrimethoxysilane, diethyl malonate and vinyl acetate, the terpolymer of vinyltriethoxysilane, dibutylmalonate and vinyl acetate, the terpolymer of vinyltrimethoxysilane, diethyl fumarate and vinyl acetate, the terpolymer of vinyltriethoxysilane, dibutyl fumarate and vinyl acetate and the like.

The latex polymers of this invention can be obtained by a process which comprises interpolymerizing the monomers in an aqueous dispersion consisting essentially of
(1) A vinyl hydrolyzable silane,
(2) A monomer selected from the class consisting of alkyl acrylates, alkyl maleates, and alkyl fumarates, said alkyl radicals having from 2 to 20 carbon atoms, and/or
(3) Vinyl acetate,
(4) Water,
(5) A catalyst and
(6) A surfactant
at a temperature ranging from about 20° C. to about 85° C., preferably from about 60° to 85° C.

The silane-vinyl acetate latex polymers of this invention are those wherein the copolymer consists essentially of about 99 to about 99.5 percent by weight of vinyl acetate and about 0.5 to about 1 percent by weight of the silane. Therefore the monomer ratios employed in preparing these latexes are governed accordingly.

The silane-ester-vinyl acetate latex polymers of this invention are those wherein the terpolymer consists essentially of about 60 (preferably about 85) to about 99 percent by weight of vinyl acetate; about 0.5 to about 39.5 (preferably about 14.5) percent by weight of the ester monomer, i.e., the acrylate esters, the maleate esters and the fumarate esters; and about 0.5 to about 5 percent by weight of the silane. Therefore the monomer ratios employed in preparing these latexes are also governed accordingly.

Any free radical catalyst or mixtures thereof conventionally known in the art can be employed. Specific examples of such catalysts are inorganic peroxides such as hydrogen peroxide, ammonium persulfate, potassium persulfate, and the like; organic peroxy catalysts such as the dialkyl peroxides, e.g. diethyl peroxide, diisopropyl peroxide, dilauryl peroxide, dioleyl peroxide, distearyl peroxide, di-(t-butyl) peroxide, di-(t-amyl) peroxide, dicumyl peroxide, and the like; the alkyl hydrogen peroxides such as t-butyl hydroperoxide, t-amyl hydroperoxide, cumene hydroperoxide, diisopropyl benzene hydroperoxide; and the like; the symmetrical diacyl peroxides, such as acetyl peroxide, propionyl peroxide, lauroyl peroxide, stearoyl peroxide, malonyl peroxide, succinoyl peroxide, phthaloyl peroxide, benzoyl peroxide and the like; ketone peroxides such as methyl ethyl ketone peroxide, cyclohexanone peroxide, and the like; the fatty oil acid peroxides, such as cocoanut oil acid peroxides, and the like; the unsymmetrical or mixed diacyl peroxides such as acetyl benzoyl peroxide, propionyl benzoyl peroxide, and the like; the azo compounds, such as azobisisobutyramidine hydrochloride, $2,2^1$-azobis(isobutyronitrile), $2,2^1$-azobis(2-methylbutyronitrile), $1,1^1$-azobis(1 - cyclohexanecarbonitrile), and the like; the disulfides; a redox type catalytic system, i.e., a catalyst and a reductant, such as the sulfate-sulfites, the sulfate-sulfoxylate formaldehydes, the peroxy-sulfites, and the like, such as potassium persulfate and sodium metabisulfite, potassium persulfate and sodium or zinc sulfoxylate formaldehyde, t-butyl hydroperoxide and sodium metabisulfite, potassium persulfate and sodium thiosulfate, and the like; or mixtures of such catalysts. Obviously only a catalytic amount of a catalyst need be employed. Generally amounts of catalyst ranging from about 0.1 to about 1.5 parts by weight based on 100 parts by weight of solid polymer in the latex will be sufficient for most purposes. The most preferred catalyst is potassium persulfate. Redox type catalyst systems are often useful in speeding up the rate of polymerization of the monomers and/or in reducing the temperature of the polymerization process. Of course it is to be understood that the polymerization of the monomers can be carried out in a closed vessel in an inert atmosphere and under autogenous pressure or under artificially induced pressure or in an open vessel under reflux at atmospheric pressure.

The amount of water present in the system is that amount sufficient to produce a latex polymer having a polymer solids content of from about 45 weight percent up to about 60 weight percent.

Any conventional anionic and nonionic surfactant or mixtures thereof can be used in the aqueous dispersion of this invention. Such surfactants are well known in the art and can be found more fully enumerated in "Synthetic Detergents," by J. W. McCutcheon, published annually by MacNair-Dorland Company, New York. Illustrative examples of such surfactants are the alkali metal salts of rosin acids, alkali metal and ammonium salts of long chain alkyl sulfates and sulfonates, the sodium salts of sulfonated hydrocarbons, alkaryl sulfonates and the like; the alkylene oxide condensates of long chain alcohols, fatty acids, mercaptans, and the like. Such surfactants are commercially available under numerous trade names such as Tergitol compounds, Igepal compounds, Sipex compounds and the like. Among the more preferred surfactants are the alkoxylated condensates of alkyl phenols such as ethylene oxides of octyl and nonyl phenol, alkoxylated condensates of alcohols such as ethylene oxides of lauryl alcohol, the alkali meal alkyl sulfonates such as sodium lauryl sulfonate, and the like. In some instances it preferred to employ both anionic and nonionic surfactants to help control particle size of the interpolymer. The amount of surfactant employed in the instant invention can range from about 0.25 to about 7 parts by weight or higher based on 100 parts by weight of solid polymer in the latex.

While not absolutely critical it is generally desirable and highly recommended that the aqueous dispersion also contain a small amount of a buffer compound for PH control of the system. Any conventional buffering agent or mixtures of such agents known in the art can be employed such as sodium acetate, sodium bicarbonate, and the like. It is generally desirable to employ that amount of buffering agent to maintain the PH of the aqueous dispersion within the range about 3.5 to about 6. This helps to prevent hydrolysis of the hydrolyzable groups on the ingredient compounds. Generally amounts of buffer on the order of about 1.0 parts by weight or less based on 100 parts by weight of solid polymer in the latex will be sufficient for most purposes.

The manner and order in which the monomers and ingredients of the above aqueous dispersion are mixed is not critical although it is extremely desirable to carry out the polymerization of the monomers under constant stirring or agitation. The method employed can be either a batch or continuous process and be carried out in one or more steps. For instance the preferred procedure is a continuous method which involves initially charging water, surfactant and buffer (when used) to an autoclave followed by a batch charge of a portion of the total monomer mix and initiating the polymerization at a low temperature with a small amount of catalyst. The polymerization reaction is exothermic and the temperature rises rapidly. Upon peaking of the temperature (generally about 80° C.) the autoclave temperature is lowered about 5 to 10 degrees and controlled by a water bath. Then separate feed streams of (1) a mixture of the monomers and (2) the catalyst are slowly fed (preferably dropwise) to the reactor, the dispersion being continuously agitated. When a redox catalytic system is employed it is preferred to add the redox compound as a separate feed also. After all of the monomer has been added it is preferred to continue addition of the catalyst for a short post heating period of a few hours to insure maximum polymerization. The monomer feed time and post heat time obviously depends only upon the quantity and reactivity of the reactants involved. Formation of the latex polymer can readily be determined visually by change of color and viscosity analysis of same e.g. solution viscosity, total solids, and the like.

The latex polymers of this invention have a wide degree of utility in the surface coatings field that is well known in the art. The instant latex polymers are particularly unique in that the interpolymers crosslink into a clear stable protective polymeric film coating merely upon drying, i.e. removal of the water from the latex. The highly crosslinked protective polymeric films derived from said latex polymers are difficultly soluble in benzene, water and acetone and exhibit excellent water and solvent resistance. In addition they are very durable and exhibit a very high degree of scrub resistance and are particularly useful as additives for high pigment volume concentration paint formulations and in ceiling tile coatings. When used unpigmented the crosslinked films produce a clear, high gloss coating. Pigmented and unpigmented films may be used as primers, undercoatings or top coatings on porous or nonporous substrates, such as metal, cement, wood, woods fibers, mineral fibers, wall board, and the like.

The formation of the crosslinked polymer upon drying of the latex polymer is readily established by the difficulty of solubility of the crosslinked polymer film in hydrocarbons, such as benzene and by an analysis of its properties, e.g. solution viscosity, and the like as compared to that of the latex interpolymer.

The following examples are illustrative of the present invention and are not to be regarded as limitative. It is to be understood that all of the parts, percentages and proportions referred to herein and in the amended claims are by weight unless otherwise indicated.

EXAMPLE 1

A latex polymer was prepared comprising an aqueous dispersion of an interpolymer consisting essentially of about 94 percent by weight of vinyl acetate, about 5 percent by weight of 2-ethylhexyl acrylate and about 1 percent by weight of vinyltrimethoxy silane by adding to a three-liter glass bottle having a four-necked separable head and equipped with a dropping funnel for monomer addition, a thermometer and a power-driven anchor agitator, and set in a water bath for heating and cooling an aqueous charge consisting of about 540 grams of water, about 32 grams of nonionic surfactant consisting of 50 percent of Terigtol NP-44 and 50 percent of Tergitol XD (ethylene oxide condensates of alkylphenols, about 4 grams of an anionic surfactant of sodium lauryl sulfate, and about 3.2 grams of $NaAc \cdot 3H_2O$ as a buffering agent. The charge was heated to about 65° C. and 5 percent of a monomer premixture consisting of about 752 grams of vinyl acetate, about 40 grams of 2-ethylhexyl acrylate and about 8 grams of vinyltrimethoxysilane were added, and the agitator speed set at such a rate that a slight vortex was maintained, along with about 10 percent of a catalytic premix consisting of 100 grams of water and about 4 grams of $K_2S_2O_8$ and with about 10 percent of a reductant premix consisting of 50 grams of water and about 4 grams of $Na_2S_2O_5$. When the temperature peaked a continuous dropwise feed of the rest of the monomer premixture, catalytic premixture and reductant premixture was begun. The balance of the monomer feed was added over 4.5 hours and the balance of the catalyst and reductant over about 5 hours while the temperature was maintained at about 70° C. The rate of agitation was increased as the solid content built up, and slowly decreased during the one hour post cure after final addition of the monomer premixture. The resultant latex polymer was white, had a total solids content of about 55 percent and a latex viscosity of about 300 centipoises at 25° C. (Brookfield RVT Viscometer, #3 spindle, 60 r.p.m.). The latex polymer upon drying (elimination of the water) cross linked into a clear durable high gloss film having excellent water and solvent resistance.

EXAMPLE 2

Employing the latex polymer of Example 1, the following pigmented latex base protective coating composition was prepared.

| Composition: | Pounds |
| --- | --- |
| Water | 455.75 |
| Phenylmercuric acetate (perservative) | 0.50 |
| Cellulosic thickener | 1.25 |
| Tetrasodiumpyrophosphate (dispersant) | 8.60 |
| Nonionic surfactant | 2.00 |
| Titanium dioxide | 100.00 |
| Clay | 150.00 |
| Calcium carbonate | 300.00 |
| Defoamer (Nopco NDW) | 2.00 |
| Latex | 195.00 |

The above paint formulation was coated onto a plastic plate and dried. The resultant coating exhibited excellent adhesion and scrub resistent properties when scrubbed with a five percent Lava soap solution on a Gardner abrasion tester equipped with a one-pound hog bristle brush.

A controlled comparison was made by preparing the same pigmented composition, except the latex used was a latex of about 95 percent by weight of vinyl acetate and about 5 percent by weight of 2-ethyl hexyl acrylate, and subjecting it to the same test procedure. This coating free from any silane in the latex exhibited poor crub resistence.

EXAMPLE 3

The procedure of Example 1 was repeated employing an aqueous charge of about 540 grams of water, about 34 grams of a nonionic surfactant of Tergitol NP-44 (ethylene oxide condensate of alkylphenol), about 6 grams of a biodegradeable anionic surfactant (Abex 185) and about 1 gram of $NaAc \cdot 3H_2O$ as a buffering agent; a monomer premix of about 750 grams of vinyl acetate, about 40 grams of 2-ethylhexyl acrylate and about 10 grams of vinyltriethoxysilane; a catalyst premix of 100 grams of water and about 4 grams of $K_2S_2O_8$; and a reductant premix of 100 grams of water and about 4 grams of $Na_2S_2O_5$ to produce about a 54 percent total solids content of a latex polymer consisting of an interpolymer of about 93.75 percent by weight of vinyl acetate, about 5 percent by weight of 2-ethylhexyl acrylate and about 1.25 percent by weight of vinyltriethoxy silane. Upon drying the latex crosslinked into a clear, high gloss film.

EXAMPLE 4

Following the procedure of Example 1 a 55 percent total solids content of a latex polymer consisting of about 94 percent by weight of vinyl acetate, about 5 percent by weight of 2-ethylhexyl acrylate and about 1 percent by weight of gamma-methacryloxypropyltrimethoxy silane was prepared. Upon drying the latex crosslinked into a clear, high gloss film.

EXAMPLE 5

Following the procedure of Example 1 a 50 to 55 percent total solids content of a latex polymer consisting of about 99 percent by weight of vinyl acetate and about 1 percent by weight of vinyltrimethoxysilane was prepared. Upon drying the latex crosslinked into a clear, high gloss film.

Similar latex polymers can be prepared merely by substituting other silanes for the above vinyltrimethoxysilane monomer, such as, vinyltriethoxysilane, vinyl-tris(2-methoxyethoxy)silane, gamma-methacryloxypropyltrimethoxysilane, vinyltriacetoxysilane, and the like.

EXAMPLE 6

About a 55 percent total solids latex polymer consisting of an interpolymer of about 94 percent by weight of vinyl acetate, about 5 percent by weight of 2-ethylhexyl acrylate and about 1 percent by weight of gamma-methacryloxypropyltrimethoxy silane was prepared by following the procedure of Example 1, omitting the buffer. Upon drying the latex crosslinked into a clear, high gloss film.

Similar latex polymers can be prepared by omitting the nonionic surfactant, anionic surfactant and/or the reductant, if desired.

EXAMPLE 7

The following latex polymers can be prepared using constituents and a procedure similar to that of Example 1 with the exception of the monomeric components.

TABLE I

| Latex | Interpolymer | Ratio (percent) | Percent total solids |
|---|---|---|---|
| A | Vinylacetate/vinyltrimethoxysilane | 99.5:0.5 | 50 |
| B | Vinylacetate/ethylacrylate/vinyltrimethoxysilane. | 60:38:2 | 50 |
| C | Vinylacetate/n-butylacrylate/vinyltriethoxysilane. | 84:15:1 | 55 |
| D | Vinylacetate/isobutylacrylate/gamma-methacryloxypropyltrimethoxysilane. | 90:9:1 | 50 |
| E | Vinylacetate/tertiarybutylacrylate/vinyltriacetoxysilane. | 75:24:1 | 60 |
| F | Vinylacetate/dibutyl maleate/vinyltrimethoxysilane. | 94:5:1 | 55 |
| G | Vinylacetate/diethyl maleate/vinyltriethoxysilane. | 92:5:3 | 45 |
| H | Vinylacetate/dibutyl fumarate/vinyltriethoxysilane. | 85:14.5:0.5 | 50 |
| I | Vinylacetate/diethyl fumarate/vinyltrimethoxysilane. | 94:5:1 | 50 |
| J | Vinylacetate/2-ethylhexylacrylate/vinyltrimethoxysilane. | 88:11:1 | 55 |
| K | Vinylacetate/amyl acrylate/gamma-methacryloxypropyltrimethoxysilane. | 85:14:1 | 60 |
| L | Vinylacetate/decylacrylate/vinyltris-(2-methoxyethoxy)silane. | 94:5:1 | 55 |
| M | Vinyl acetate/octadecyl acrylate/vinyltrimethoxysilane. | 85:10:5 | 45 |

Various modifications and variations of this invention will be obvious to a worker skilled in the art and it is to be understood that such modifications and variations are to be included within the purview of this application and the spirit and scope of the appended claims.

What is claimed is:

1. A latex polymer consisting essentially of an aqueous dispersion of a copolymer consisting essentially of about 99 to about 99.5 percent by weight of vinyl acetate and about 0.5 to about 1 percent by weight of a silane having the formula $$R_3SiX$$

wherein X represents a radical selected from the group consisting of gamma-methacryloxypropyl and vinyl radicals; wherein each R individually represents a hydrolyzable radical selected from the group consisting of acetoxy and alkoxy radicals having from 1 to 8 carbon atoms; and wherein the total solids of said dispersion ranges from about 45 up to about 60 percent by weight and wherein the aqueous dispersion contains as additional ingredients based on 100 parts by weight of the copolymer, (a) a catalytic amount of a free radical catalyst; (b) about 0.25 to about 7 parts by weight of a surfactant selected from the group consisting of an anionic surfactant, a nonionic surfactant, and mixtures thereof, and (c) a buffering agent in an amount sufficient to maintain the pH of the aqueous dispersion within the range of about 3.5 to about 6.

2. A latex polymer as defined in claim 1, wherein the silane is vinyltrimethoxysilane.

3. A crosslinked polymer obtained by drying a latex polymer as defined in claim 1.

4. A crosslinked polymer obtained by drying a latex polymer as defined in claim 2.

5. A vinyl acetate-vinyl silane copolymer aqueous emulsion produced by reacting a mixture consisting of from about 99% to about 99.5% of vinyl acetate and from about 0.5% to about 1% of vinyl silane selected from the group consisting of vinyl trimethoxysilane, vinyl triethoxysilane and vinyl tris(2-methoxyethoxy) silane, based upon the total weight of the monomers used, in an aqueous dispersion containing surfactant and a free radical catalyst at a temperature ranging from about 20° C. to about 85° C.

References Cited

UNITED STATES PATENTS

| 2,956,044 | 10/1960 | Merker | 260—46.5 UA |
| 3,203,919 | 8/1965 | Brachman | 260—29.6 TA |
| 3,278,476 | 10/1966 | Santelli | 260—29.6 MQ |
| 3,449,293 | 6/1969 | Burzynski et al. | 260—46.5 UA |

FOREIGN PATENTS

| 1,149,935 | 4/1969 | Great Britain | 260—29.6 T |

WILLIAM H. SHORT, Primary Examiner

L. M. PHYNES, Assistant Examiner

U.S. Cl. X.R.

117—161 ZA; 260—17 R, 29.6 T, MQ, ME, 41B, 46.5 UA, 78.5 BB, UA, E; 80.71, 85.7